March 24, 1964 H. P. HEMPEL 3,126,529
NON-DESTRUCTIVE READ-OUT
Filed Dec. 31, 1958 3 Sheets-Sheet 1

INVENTOR
HERMAN P. HEMPEL
BY Edgar H. Kent
ATTORNEY

NON-DESTRUCTIVE READ-OUT

Filed Dec. 31, 1958 3 Sheets-Sheet 3

United States Patent Office 3,126,529

Patented Mar. 24, 1964

3,126,529

NON-DESTRUCTIVE READ-OUT

Herman P. Hempel, Red Hook, N.Y., assignor to International Business Machines Corporation, New York, N.Y., a corporation of New York

Filed Dec. 31, 1958, Ser. No. 784,367

1 Claim. (Cl. 340—174)

The present invention relates to an information storage system and more particularly to a system which utilizes magnetic material for the storage of information in binary form.

Memory systems of the prior art, have employed storage elements composed of magnetic materials having substantially rectangular hysteresis characteristics which provides two distinct states of remanence. In those systems a so-called destructive read-out process has been utilized. In general each magnetic memory element is set in one of its two magnetic remanence states to indicate either a binary one or a binary zero during a store or write cycle. In the read cycle a read-out pulse of sufficient magnitude to switch the elements to the same state, typically "zero," is applied to all the elements associated with the desired word. There is very little flux change in the elements which are in the "zero" state and therefore they do not induce a significant voltage in the associated sense windings, but those elements which are in the "one" state induce substantial voltages in their sense windings due to the relatively large changes in flux which occur when the element is switched from one remanence state to the other. However, this operation destroys the information that it stored in that register as all the elements are placed in the "zero" condition. In order to retain the information in memory the "ones" must be written into those elements from which that value was read out. Typically, this is accomplished by applying to all the elements a "one" switching signal and simultaneously applying to those elements which had stored a "zero" previously an inhibiting signal which overrides the "one" drive level and prevents the element from switching. The time required for access to memory is substantial due to the necessity to use two groups of pulse signals during each read cycle. With constantly increasing demand for more computer capacity and higher speed operation it is desirable to reduce the length of this cycle and it is a primary object of this invention to provide a system which accomplishes this desired reduction in the length of the memory cycle.

Another object of the invention is to provide a novel magnetic memory system which provides for the non-destructive read-out of information stored therein.

The invention utilizes a storage element composed of a magnetic material which has an axis of easy magnetization (uniaxial anisotropy). A multiplicity of these elements may be arranged in multicoordinate groupings to provide a memory system suitable for use with data processing equipment. The magnetic material, for example, a film having a thickness in the order of 100 to 12,000 Angstroms, has the characteristic that its domains tend to line up parallel to this easy axis of magnetization, the polarity of the domains depending on the direction of the magnetic field force last applied. I have found that the application of a magnetic field in quadrature to this easy axis exerts a force on the aligned domains which tends to rotate them in a direction away from that axis of easy magnetization and that if a sense wire is properly placed adjacent to the magnetic element, a signal of detectable magnitude is induced in that wire in accordance with Faraday's law of electromagnetic induction. That signal has a polarity which is dependent on the direction in which the domains were aligned. When the magnitude of this quadrature field is not excessive the resultant magnetic vector of the domains, upon the removal of the field, tends to rotate back to its original position of remanence, inducing a signal pulse of opposite polarity in the sense line. Thus the application of an appropriate quadrature field to the magnetic elements produces signals indicative of the binary information stored in each element without destroying that information. There is no necessity to provide an additional pulse to rewrite the information where continued storage is desired. This read-out system has several advantages, among which are a much shorter read-out cycle, and a positive indication on read-out of both binary values.

Other objects and advantages of the invention will be seen as the following description of preferred embodiments of the invention progresses, in conjunction with the drawings in which.

Figure 1:
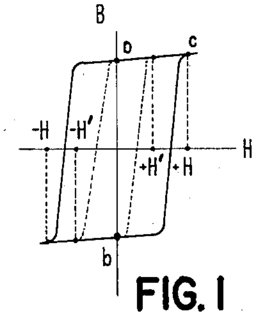
FIG. 1 is a graph of a representative hysteresis curve for the magnetic material preferred for use with a system incorporating principles of the invention.

Magnetic materials used in memory element have substantially rectangular hysteresis loops as generally shown in FIG. 1. The B-H curve shown there illustrates the hysteresis characteristics of a typical thin magnetic film material employed in a system according to the present invention. In memory systems utilizing similar magnetic elements the elements are selectively driven to one or the other of their stable residual states *a* or *b* by energizing associated windings and thereby applying a magnetomotive force of the desired magnitude and direction. One of the stable remanence states is arbitrarily chosen to represent a binary "one" (point *a*) and the other stable state then represents a binary "zero" (point *b*). The application of the magnetizing force +H will place the element in the binary "one" state and a magnetizing force of magnitude −H will place the element in a binary "zero" state. Thus if the magnetic element is in remanence state *b* (binary zero) and magnetomotive force of a magnitude equal to or greater than +H is applied to the magnetic element the major hysteresis loop will be traversed from point *b* to point *c* and upon relaxation of this force the magnetic element returns to the stable remanence state at point *a* (binary "one"). Magnetomotive forces of smaller magnitudes are insufficient to switch the material from one of the remanence states to the other.

In the case of magnetic elements having uniaxial anisotropy (an axis of easy magnetization), however, the application of a transverse or quadrature field to the magnetic element effectively decreases the width of the hysteresis loop, thereby reducing the threshold field required for switching. The resultant effective hysteresis loop of reduced width is indicated generally in dotted lines in FIG. 1. The width of the hysteresis loop of such material is at a maximum in the absence of a transverse field and is reduced an amount indicated, for example, by the points +H' and —H', dependent upon the magnitude of that transverse field. The simultaneous application of a longiutdinal field (H) and a quadrature field (I) results in a faster switching time of the magnetic element of one remanence state to another than possible with a longitudinal field alone.

The mechanism of switching of magnetic materials from one remanence state to another although not fully understood involves the following factors. Magnetic material contains a multiplicity of small magnetically saturated regions which are called domains. In demagnetized material these domains are randomly positioned such that the resultant magnetization of the specimen as a whole is zero. Movement of the domains may be accomplished in two ways, by rotation and by domain wall motion. In rotation, which is characteristic of domain movement in strong magnetic fields, the magnetic vector which is representative of all the domains in the material rotates similarly to a compass needle. This mechanism provides the faster switching from one remanence state to the other. In low and medium magnetic fields the movement of domains is by boundary wall motion in which a small domain gradually increases in size, expanding its boundaries to encompass other domains. It is relatively a slower process than rotation.

Figure 2:
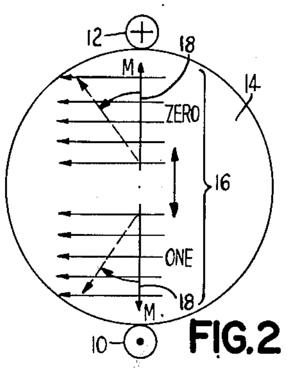
FIG. 2 is a diagrammatic illustration of the movement of domains in a magnetic element during the non-destructive read-out process.

Certain materials exhibit the characteristics of uniaxial anisotropy, in which the magnetic domains in the material tend to line up along an easy axis of magnetization. This characteristic may be produced in thin films of magnetic material which are in the order of 100 to 12,000 Angstroms in thickness. Other forms of magnetic material such as tapes and ferrites also exhibit this characteristic under certain conditions. Some of such materials have, in addition, a rectangular hysteresis loop characteristic so that two distinct remanence states are provided. Such elements are suitable for the storage of binary coded information. I have found the application of a magnetic field to the material at right angles to its easy axis produces a relative movement of the domains which is sufficient to induce a signal in a sense winding suitably positioned adjacent the magnetic element. The polarity of this induced signal is dependent on which of the two remanence states the material was in at the time of application of the magnetic field. This quadrature magnetic field tends to rotate the magnetic vector from its remanence state toward a position in line with the magnetic field and, if the magnetic field is not too large, the vector tends to return or relax to its original remanence state upon removal of the field, substantially as shown in FIG. 2. In that diagram the quadrature field is generated by two conductors 10, 12 positioned perpendicularly to the plane of the film 14 but in a plane parallel to the axis of easy magnetization (as indicated by the two headed arrow). Current flow in the conductors produces a magnetic field having a direction as indicated by the arrows 16 which tends to rotate the magnetic vectors 18 from either solid line position (depending upon which remanence state the material is in) toward the dotted line position as diagrammatically illustrated. Upon termination of current flow, the magnetic field decays and the domains return to their initial positions.

Figure 3:
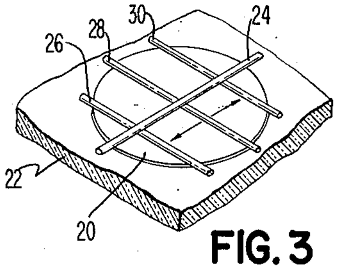
FIG. 3 is a diagrammatic view of a single magnetic element and its associated conductors as utilized in one embodiment of the invention.

The preferred uniaxial anisotropic magnetic element is a thin film disk 20 shown in FIG. 3 and having a composition of approximately 83% nickel and 17% iron. However, other magnetic materials such as the Permalloys which exhibits suitably hysteresis characteristics may also be used. The material is evaporated or otherwise deposited by suitable means on a substrate 22, usually of glass, in a high vacuum ($10^{-6}$ mm. Hg) to a thickness of 1,000 Angstroms and in the presence of a magnetic field such that the deposited material has a uniaxial anisotropic characteristic, i.e., an axis of easy magnetization along which the domains tend to lie (as indicated by the double headed arrow).

Suitable associated leads or conductors for translating various signals are positioned relative to the thin film disk by printing, etching or other suitable means. Several conductors are required to be positioned adjacent the magnetic element as components of the magnetic system. These include a quadrature winding 24, a "store" winding 26, an "inhibit" winding 28 and a "sense" winding 30.

Figure 4:
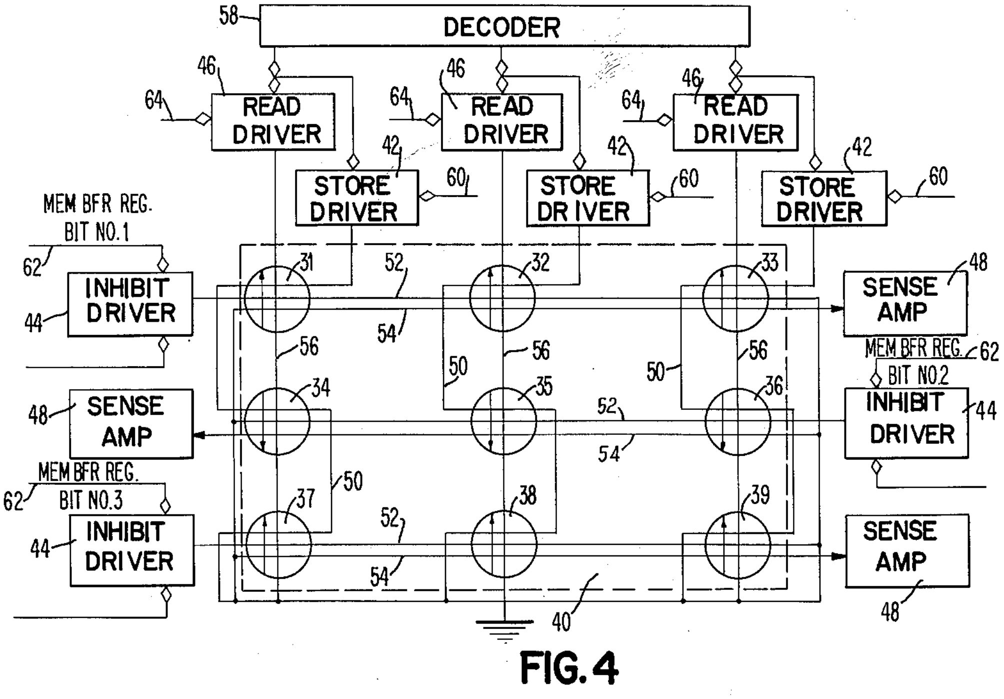
FIG. 4 is a logical diagram of a two dimensional memory system incorporating principles of the invention.

The magnetic element of FIG. 3 is adapted to be used in the two dimensional memory plane shown in FIG. 4. That memory plane consists of nine thin film elements (31–39) positioned on a substrate 40, each having certain associated windings. Associated with the memory plane are store drivers 42 and inhibit drivers 44 all of which may be of the type described in the copending application Serial No. 590,701 now Patent No. 2,947,977, filed by Erich Bloch on June 11, 1956. The read drivers 46 may be any pulse generating circuit which generates a pulse of sufficient amplitude to provide a transverse field of relative intensity of 0.1 to 0.4 oersted in the associated magnetic elements. Associated with each bit in the word is a sense amplifier 48. As may be seen from the drawing the store conductors 50, the inhibit conductors 52 and the sense amplifier conductors 54 are aligned parallel to one another and are positioned perpendicular to the easy axis of magnetization of the magnetic elements (as indicated by the arrow on each element) and the read conductors 56 are positioned parallel to that easy axis of magnetization.

Figure 5:
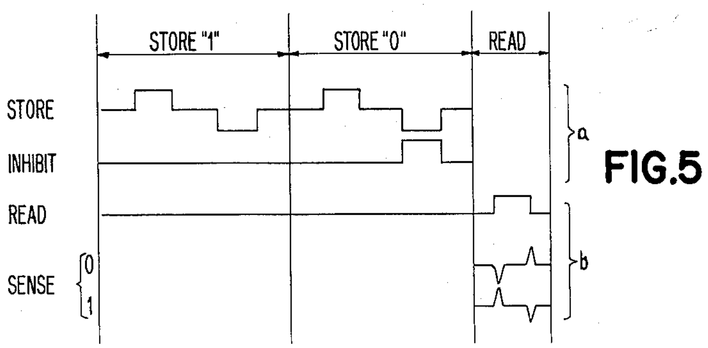
FIG. 5 is a diagram of representative pulse forms used in the reading and writing operations of the memory system of FIG. 4.

Information is written into the core during a "store" cycle. The decoder 58 is actuated and selects one of the store drivers 42. A signal on its associated line 60 energizes that driver to produce a positive pulse which clears the magnetic elements of the selected register (for example, elements 31, 34 and 37) to "zero." A negative pulse is then produced by the store driver which is adapted to write a "one" into each of the elements of that register. If information from the memory buffer register (not shown) indicates that a "zero" is to be written into an element in the register, the inhibit driver 44 associated with that element is conditioned by a signal from the memory buffer register over line 62 and develops a positive overriding pulse simultaneously with the generation of the negative pulse by the store driver which overrides the effect that driver's negative pulse and prevents the switching of that magnetic element to the one state. The pulses produced during this conjoint action of the store and inhibit drivers are indicated diagrammatically in FIG. 5(*a*). This, in general, follows the conventional method of writing information into magnetic memory elements as it includes two pulses which follow each other in time.

The "read" cycle, however, is of much shorter duration than the "store" cycle as only one pulse is required as indicated in the diagrammatic illustration of FIG. 5*b*. It has been estimated that 85–90% of the memory cycles in computer operation are "read" cycles and therefore shorter duration can effect large savings in cycle time, and hence a substantial increase in the amount of data processed. When it is desired to read a word from a register of the memory the decoder selects the read driver 46 associated with that register and a signal on associated line 64 energizes that driver so that a pulse of current flows in conductor 56 and a suitable magnetic field adjacent the associated magnetic elements is produced which causes rotation of the magnetic vectors of those elements away from their easy axes of magnetization, thereby inducing a voltage in the associated sense windings 54. The change of flux due to the rotation of the magnetic vector induces small but detectable signals in the sense windings on initial energization of conductor 56 and again on relaxation of the quadrature field, as indicated in FIG. 5*b*, which are amplified by the sense amplifiers 48. As there shown, a signal is induced whether a "one" or a "zero" was stored in the element, thus giving a positive indication of the binary value. Tests indicate that a narrow pulse (less than 0.2 microsecond width) of approximately 50 millimicrosecond rise time which provides a current in the order of 100 milliamperes is suitable for use in a non-destructively read cycle of magnetic storage elements of this type. A thin film disk one centimeter in diameter under this condition produced a non-destructive read-out signal of two millivolts positive for a "one" and two millivolts negative for a "zero" with a single turn of sense wire. Thus this system provides a "read" cycle which is much faster than those previously utilized due to the incorporation of higher speed storage elements and additionally the elimination of the destructive type of read cycle.

A limitation of a memory system of this type is that the usual coincident current selection system which has been utilized with large magnetic memories of the prior art is somewhat inappropriate with this type of read-out as there is a tendency for the half select signals from the non-selected bits to override the desired signal. Means to uniquely select the drive line associated with the selected word would overcome this difficulty. However, the present complexity of drivers seriously limits the size of memory that could practically utilize this non-destructive read-out system if one driver per line was to be employed.

Figures 6, 7, 8:
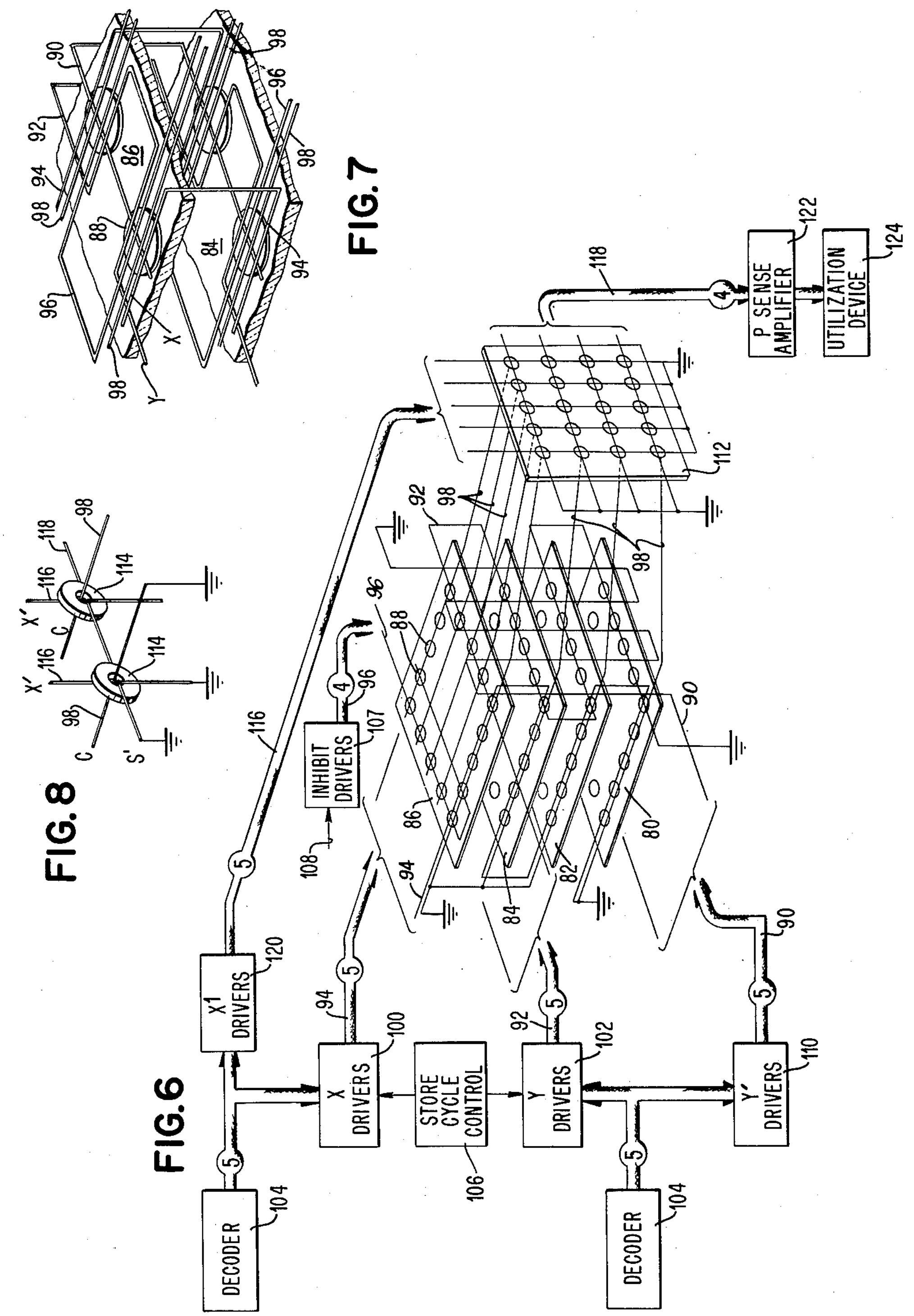
FIG. 6 is a diagrammatic illustration of a three dimensional memory system incorporating principles of the invention.
FIG. 7 is a perspective diagrammatic view of a portion of the memory system of FIG. 6.
FIG. 8 is a perspective diagrammatic view of a portion of a plane of saturable cores associated with the memory system of FIG. 6.

A three dimensional memory system which incorporates non-destructive read-out in accordance with the invention and which departs somewhat from conventional memory access methods is shown in FIG. 6. As shown there are four planes 80, 82, 84, 86 in the memory and each plane has twenty-five magnetic elements 88. While a reduced number of magnetic elements have been shown in order to increase the clarity of description and illustration, it is obvious that the number of magnetic elements in a plane and the number of planes may be varied as desired.

A section of this memory is shown in FIG. 7. Each magnetic element 88 is deposited on a suitable substrate in the manner above described so that it has uniaxial anisotropic characteristics. As each substrate is common to a plane it will be designated by the reference numeral associated with that plane. Thus in FIG. 7 the planes 84 and 86 are shown. A quadrature winding 90 links all the film elements in a vertical plane and there are five such quadrature windings parallel to one another. A Y drive winding 92 also links all the elements in the same vertical plane that is defined by the elements that are linked by a corresponding quadrature winding 90, and there are five such windings. Five X drive windings 94 positioned in parallel planes link the elements in vertical planes that are perpendicular to the planes defined by the Y drive windings. An inhibit winding 96 links all the elements in each horizontal plane and there are four such windings. Finally there is a sense winding 98 associated with each row of magnetic film disks parallel to the X drive lines 94 and thus there are twenty such windings.

Conventional X and Y drivers 100 and 102 respectively (shown in FIG. 6) are associated with the memory and information is written into the memory in the conventional coincident current manner. The two drivers associated with the selected word register as determined by the decoders 104 are energized by the store cycle control 106. Each driver generates a half-select current over a selected line 94 and a selected line 92 respectively and the two currents are of sufficient magnitude at the selected register to produce a full select current, thereby switching the four magnetic elements in the vertical line (at the intersection of an X plane and a Y plane) which defines that selected register in the memory. The elements in that register are initially cleared to "zero" and then are pulsed over lines 92 and 94 to write a "one" into them. The inhibit drivers 107, supplied with information from the memory buffer register over line 108, generates inhibit pulses over lines 96 to those planes which contain an element in which a "zero" rather than a "one" is to be written.

A second set of drivers are used in the non-destructive read cycle. A Y′ driver 110 associated with the register to be read, is conditioned by the decoder 104. The associated quadrature winding 90 is energized and applies a transverse magnetic field to all the storage elements in the Y plane which includes that register. Information signals are generated from all the elements of that plane and are transmitted over the associated sense windings 98.

If the several words of information are stored in a Y plane are desired, in a predetermined order as, for example, the commands in a microprogrammed computer, these words may be read out by energizing the single quadrature (Y′) winding. Necessary intervals between the transmission of individual words, where required, are introduced by delay lines associated with the quadrature winding or by other means well-known in the art. The information read-out would be transmitted over the sense windings to sense amplifiers for utilization as desired.

However, where only a single word of information is required, as in the more usual case, the sense windings are passed through the plane 112 of saturable magnetic cores 114. Each of the cores has accurate transformer characteristics for low amplitude signals but saturates when subjected to a comparatively small drive field (in the order of 0.1 oersted). Two of the cores 114 are shown in FIG. 8 together with associated conductors. An X′ conductor 116 passes through each core in a vertical row and a sense amplifier conductor 118 passes through each core in a horizontal row. There are a total of five X′ conductors and four sense conductors in the described embodiment. An individual sense winding 98 passes through each core.

Prior to the energization of a Y′ driver 110 a set of X′ drivers 120, which are controlled by the decoder 104, are conditions and generate drive signals which are sufficient to saturate all the cores in their associated lines. All of the drivers except that one associated with the selected X address are energized and thus all the cores in the plane 112 other than those cores in the selected X line are saturated. The drivers may be any pulse generating circuit which generates a pulse of sufficient amplitude to provide a field having a relative intensity about 0.1 oersted in the associated cores.

When a Y′ driver 110 is subsequently energized the signal that is read out due to the energization of the quadrature winding will be impressed on all the cores but only those cores which are not saturated will reflect the signals.

The resultant non-destructive read signals from 2 single registers will then be induced in lines 118 and transmitted through the sense amplifier 122 to the utilization device 124 which may be a storage register associated with a digital computer, for example.

Thus a comparatively simple magnetic gating circuit has been provided which enables the avoidance of certain problems associated with coincident current selection when utilizing the non-destructive read-out principles of the invention. This gating equipment enables the generation and transmission to the sense amplifiers of signals of one polarity when an one is read out and of the opposite polarity for a zero thereby providing a positive indication of each type of information.

Figure 9:
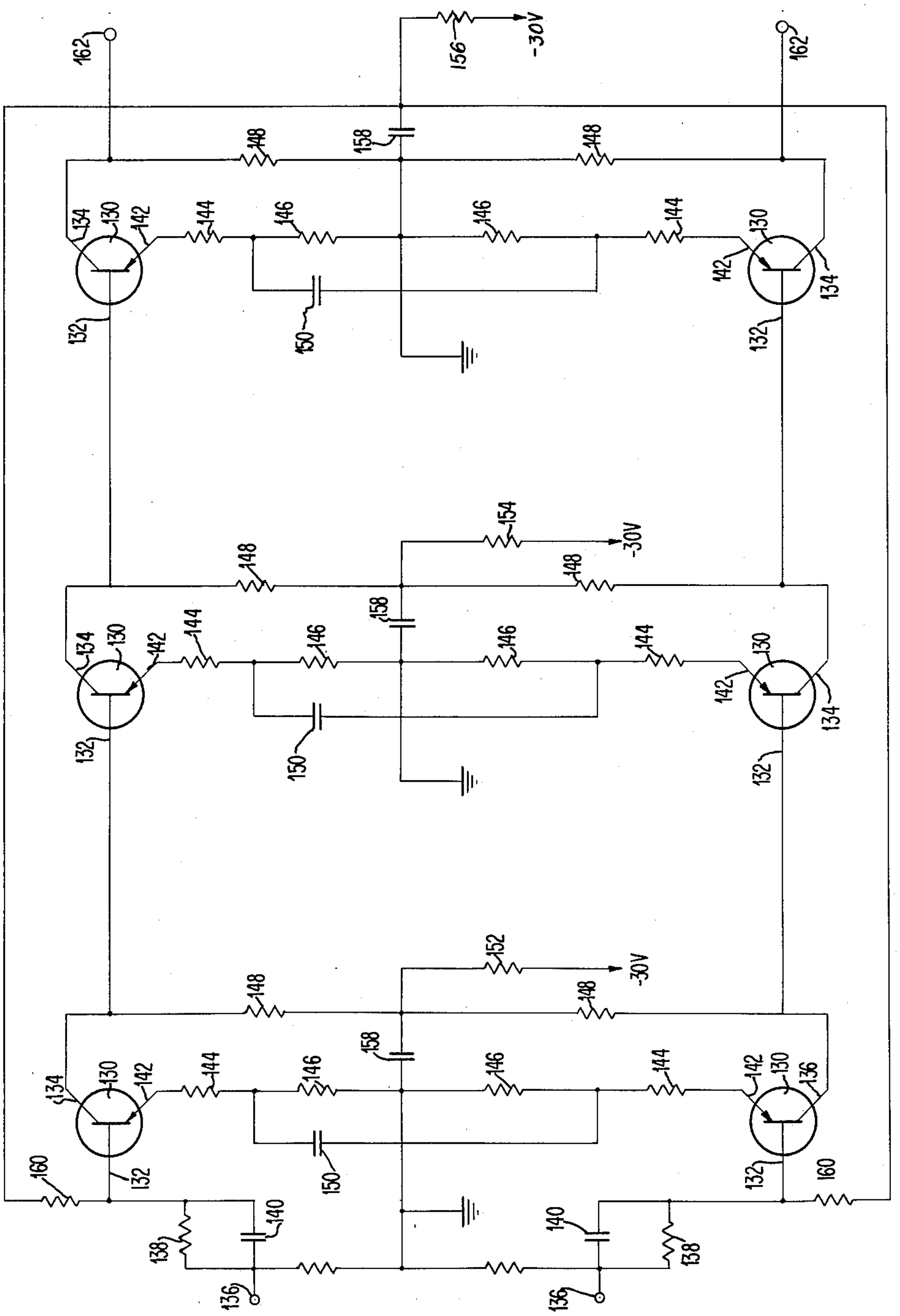
FIG. 9 is a schematic diagram of a sense amplifier.

The sense amplifier used in a preferred embodiment is shown in FIG. 9. This film memory sense amplifier provides high gain with short amplifier delay, low noise and wide band width. The amplifier is designed to raise an input level of one millivolt to an output level of three volts. The amplifying circuit includes three direct coupled amplifying stages, each including two PNP transistors 130 connected in grounded emitter configuration. The signals are applied to the base electrodes 132 of each amplifier stage and coupled via the collector electrodes 134 to the next amplifying state. The input signal level is applied through the input terminals 136 coupling resistors 138 and overdrive capacitors 140 to the base electrodes of the first stage. Each emitter electrode 142 includes a feedback resistance 144 which minimizes the change in gain caused by variations in parameters of the transistors, and a series-dropping resistor 146. Each collector resistor 148 has a value selected to minimize the effect of circuit and transistor capacitance. Capacitance 150 is coupled between the oppositely poled sections of each amplifier stage. This differential coupling insures that the A.C. signal output levels for a pair of oppositely poled sections are balanced and thus common mode signals are canceled. The common series resistances 152, 154 and 156, connected to a source of negative potential 30 volts in magnitude, supply bias current to the oppositely poled sections and reduce the noise introduced into the amplifier by ripple in the power supply. Coupling capacitances 158 are provided between the emitter and collector circuits. D.C. feedback is provided from the output of the third stage to the inputs of the first stage via the resistors 160. The output signal, taken from terminals 162, is applied to an appropriate utilization device, for example, a buffer register.

The following are suitable types and values of the elements used in this circuit:

| | |
|---|---|
| Transistors 130 | Philco L 5404 |
| Resistors 138 ohms | 3600 |
| Capacitors 140 microfarads | 0.52 |
| Resistors 144 ohms | 5 |
| Resistors 146 do | 1200 |
| Resistors 148 do | 270 |
| Capacitors 150 microfarads | 0.02 |
| Resistors 152 ohms | 1500 |
| Resistors 154 do | 1200 |
| Resistors 156 do | 1000 |
| Capacitors 158 microfarads | 0.02 |
| Resistors 160 ohms | 4700 |

There has been disclosed certain embodiments of a novel system for non-destructive reading of information from magnetic storage elements. Such a system provides a more rapid access to a digital computer memory, enabling a substantial increase in the computer's operational speed as the number of read cycles in a normal computer program are about 85 to 90 percent of the total number of memory cycles. In addition storage elements utilizing the principles of this invention have advantages of compactness and of economy of construction. The memory system according to the invention in addition provides a high speed system which permits rapid storage and accessibility of binary coded data and is suitable for a variety of applications.

While there have been shown and described herein certain preferred embodiments of the invention it will be understood that the invention is not intended to be limited thereto or to details thereof and departures may be made therefrom within the spirit and scope of the invention as defined in the following claim.

I claim:

A three-dimensional binary information storage system comprising a multiplicity of thin film magnetic elements arranged in a plurality of planes, each said plane including a plurality of magnetic elements arranged in rows and columns to provide a coordinate addressable system, each said magnetic element having uniaxial anisotropic characteristics such that it is provided with an axis of easy magnetization and each said magnetic element having two distinct magnetic remanence states, coordinate means associated with said system including two conductors disposed immediately adjacent each said thin film magnetic element, parallel to the plane of that element and perpendicular to the axis of easy magnetization of that element, means to energize said coordinate means to produce magnetic fields in an element to store binary coded information in that element by placing that magnetic element in one of said two distinct magnetic remanence states, sense conductor means associated with each plane disposed immediately adjacent each magnetic element, parallel to the plane of that element and perpendicular to the axis of easy magnetization of that element, means associated with said system to non-destructively read out said stored information consisting of read out conductor means disposed immediately adjacent each magnetic element, parallel to the plane of that element and parallel to the axis of easy magnetization of that element, and means to pass electric current through said read out conductor means to generate a magnetic field of a magnitude in the order of 0.1 to 0.4 oersted acting perpendicular to said axis of easy magnetization to cause domain rotation in an immediately adjacent magnetic element sufficient to induce a detectable signal in said sense conductor means representative of the information stored in the magnetic elements associated with the energized read out conductor means but insufficient to switch those magnetic elements from the magnetic remanence state in which they were in to the other magnetic remanence state so that those magnetic elements return to their original magnetic remanence state upon termination of electric current flow in said read out conductor means, a plane of saturable cores arranged in rows and columns, each of said sense conductors being inductively coupled to a corresponding saturable core, an amplifier conductor inductively coupled with each row of said saturable cores for transferring information applied to said saturable cores by said sense conductors, and means to selectively saturate columns of said saturable cores to inhibit said transfer of information.

References Cited in the file of this patent

UNITED STATES PATENTS

| | | |
|---|---|---|
| 3,015,807 | Pohm et al. | Jan. 2, 1962 |
| 3,030,612 | Rubens et al. | Apr. 17, 1962 |

FOREIGN PATENTS

| | | |
|---|---|---|
| 1,190,683 | France | Apr. 6, 1955 |

OTHER REFERENCES

Publication I: Pohm et al., "A Compact Coincident-Current Memory," Proceedsings of the Eastern Joint Computer Conference, December 10–12, 1956, pages 120–123.

Publication II: Article entitled "Nondestructive Sensing of Magnetic Cores," by Buck and Frank in "Communciations and Electronics," pp. 822–830, No. 31, January 1954.

Publication III: Article entitled "Preparation of Thin Magnetic Films and Their Properties," by Blois in "Journal of Applied Physics," pp. 975–980, August 1955.

Publication IV: "Thin Films, Memory Elements" in "Electrical Manufacturing," vol. 61, No. 1, January 1958, pp. 95–98.